United States Patent
Wei et al.

(10) Patent No.: US 7,350,010 B2
(45) Date of Patent: Mar. 25, 2008

(54) METHOD AND AN APPARATUS FOR SWITCHING ROOT CELLS FOR A COMPUTER SYSTEM WITHOUT REQUIRING THE COMPUTER SYSTEM TO BE RE-BOOTED

(75) Inventors: Dong Wei, Granite Bay, CA (US); Raghuram Kota, Fort Collins, CO (US); Toshimitsu Kani, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 11/261,374

(22) Filed: Oct. 28, 2005

(65) Prior Publication Data

US 2007/0101038 A1    May 3, 2007

(51) Int. Cl.
*G06F 13/00* (2006.01)
*G06F 9/44* (2006.01)
*G06F 15/16* (2006.01)
*G06F 15/177* (2006.01)
*G11C 29/00* (2006.01)

(52) U.S. Cl. .................. 710/302; 710/104; 713/1; 713/100; 719/321

(58) Field of Classification Search ............... 710/301, 710/302, 104, 8; 711/203; 707/100; 713/1, 713/100; 718/1; 719/321, 324
See application file for complete search history.

(56) References Cited

U.S. PATENT DOCUMENTS

| | | | | |
|---|---|---|---|---|
| 6,065,068 A * | 5/2000 | Foote | ................. | 710/13 |
| 6,819,606 B2 * | 11/2004 | Benedix et al. | ............. | 365/200 |
| 6,823,516 B1 * | 11/2004 | Cooper | ................. | 718/108 |
| 6,907,474 B2 * | 6/2005 | Oshins et al. | ............. | 719/321 |
| 6,941,480 B1 * | 9/2005 | Dai | ................. | 713/320 |
| 7,181,382 B2 * | 2/2007 | Shier et al. | ............. | 703/13 |
| 7,197,631 B1 * | 3/2007 | Fischer et al. | ............. | 713/1 |
| 2002/0059473 A1 * | 5/2002 | Oshins et al. | ............. | 709/321 |
| 2003/0226015 A1 * | 12/2003 | Neufeld et al. | ............. | 713/166 |

OTHER PUBLICATIONS

"ACPI thermal sensing and control in the PC" by J. Steele (abstract only) Publication Date: Sep. 15-17, 1998.*

* cited by examiner

*Primary Examiner*—Gopal C. Ray (57) ABSTRACT

Embodiments of the present invention pertain to methods and systems are described for switching root cells for a computer system without requiring the computer system to be re-booted. In one embodiment, objects are used to represent fixed registers associated with a first cell and a second cell of the computer system. In response to detecting that the second cell should be used instead of the first cell as a root cell for the computer system, the objects are used to communicate information between firmware and an operating system associated with the computer system, wherein the information describes the fixed registers associated with the second cell.

20 Claims, 3 Drawing Sheets

Apparatus 100

Fixed Register Describer
110

Fixed Register Communicator
120

FIG. 3

METHOD AND AN APPARATUS FOR SWITCHING ROOT CELLS FOR A COMPUTER SYSTEM WITHOUT REQUIRING THE COMPUTER SYSTEM TO BE RE-BOOTED

TECHNICAL FIELD

Embodiments of the present invention relate to hot plugging cells into a computer system for the purpose of expanding the resources available to a computer system. More specifically, embodiments of the present invention relate to switching root cells for a computer system without requiring the computer system to be re-booted.

BACKGROUND ART

In today's computing environment, customers want an easy way to expand their computer systems to include more resources, such as central processing units (CPUs), memory, and/or input/output (I/O) devices, etc. Components called cells provide customers with that capability. For example, cells are components that include any permutation of CPUs, memory, and/or I/O devices, among other things. A computer system can be expanded by installing cells into the computer system. Frequently, the cells can be installed without re-booting the computer system simply by plugging the cell into the computer system (commonly referred to as "hot plugging" or "plug-and-play"), for example. Frequently, a "root cell" can be installed on a computer system. Besides CPUs, memory, and/or I/O devices, a "root cell" can include additional special resources, such as console devices and/or fixed registers. The operating system (OS) can use the fixed registers for system events, for example.

Advanced Configuration and Power Interface (ACPI) is a computer language that can be used for writing parts of a computer system's firmware. ACPI can be used for providing information about cells (e.g., describe cells) to a computer system, among other things as will become more evident. In conventional systems, the root cell of a computer can not be hot plugged for computer systems that use ACPI to describe cells because ACPI defines registers associated with the root cell as "fixed registers," using a "fixed address descriptor table" (FADT). The "fixed registers" are specified in the FADT and when the computer system is booted up, the operating system proceeds to use the registers specified in the FADT for various system events, for example. The operating system is informed of which registers to use as fixed registers and there is no way to use different registers without modifying the FADT and re-booting the computer system. Therefore, there is no way to "hot plug" a different cell with a different set of fixed registers into the computer system as the root cell.

For these and other reasons, there is a need for a method and/or an apparatus that provides for switching the root cell for a computer system without requiring the computer system to be re-booted.

DISCLOSURE OF THE INVENTION

Embodiments of the present invention pertain to methods and systems are described for switching root cells for a computer system without requiring the computer system to be re-booted. In one embodiment, objects are used to represent fixed registers associated with a first cell and a second cell of the computer system. In response to detecting that the second cell should be used instead of the first cell as a root cell for the computer system, the objects are used to communicate information between firmware and an operating system associated with the computer system, wherein the information describes the fixed registers associated with the second cell.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

One example where switching root cells by, for example, hot plugging a new root cell into a computer system can be useful is in the event that the currently installed root cell for a computer system becomes defective. In this case, the computer system typically generates and logs error messages that a system's administrator will see. When the system's administrator sees the error messages, the system's administrator can cause a computer system to use a new cell as the root cell, according to one embodiment. For example, the system's administrator can use an eject command to cause the defective root cell to be ejected. In another embodiment, the firmware detects that an ejection of the root cell has been initiated and cause a different cell to be used as the root cell. In yet another embodiment, the firmware uses information that has been previously entered into the computer system to determine, for example, what cell should replace the root cell in the event that the root cell becomes defective. Further, the firmware and the operating system communicate to provide the operating system with information about the fixed registers associated with the new root cell so the operating system can start to use the new fixed registers, according to still another embodiment.

Figure 1:
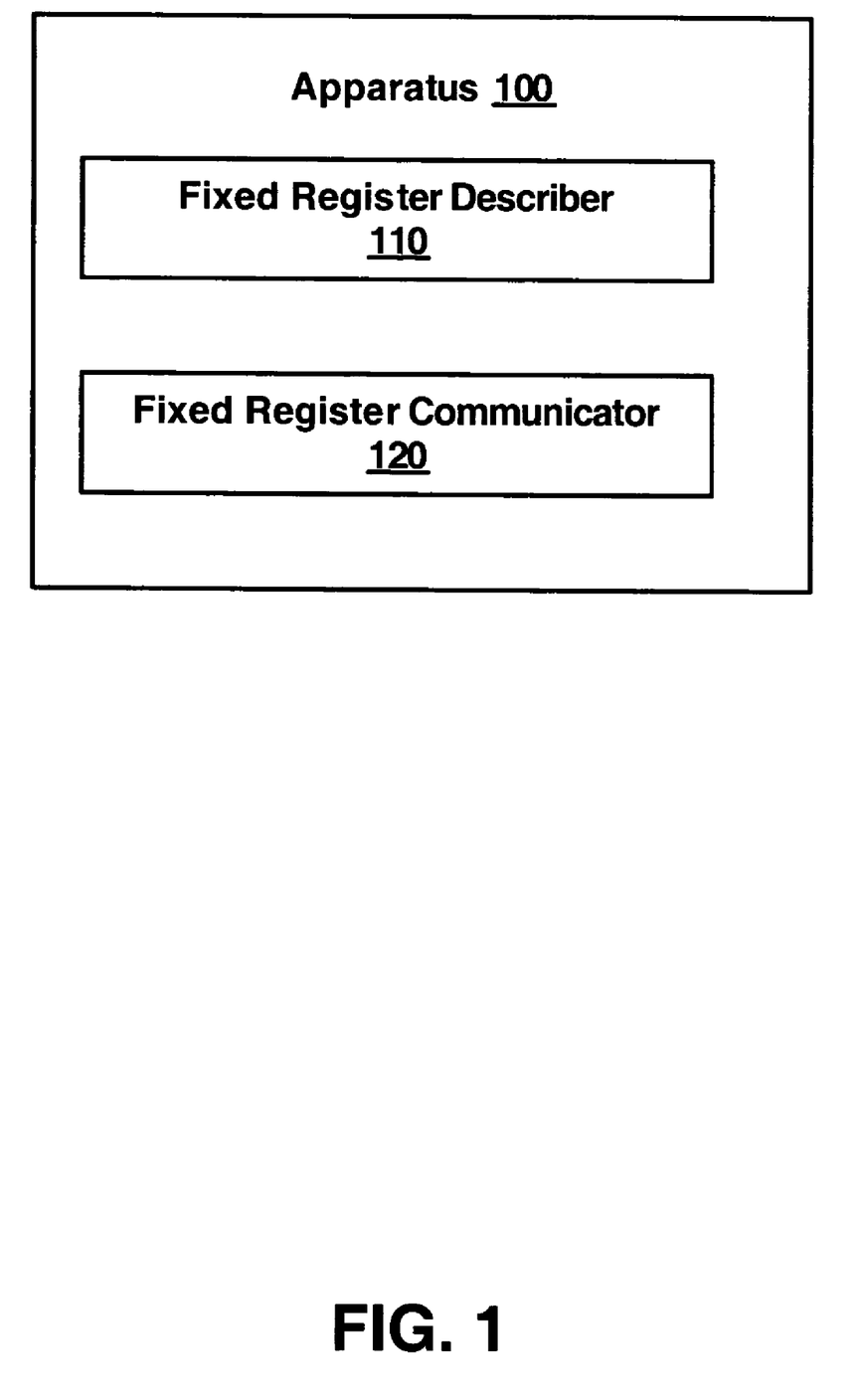
FIG. 1 is a block diagram of an exemplary apparatus for switching root cells for a computer system without requiring the computer system to be re-booted, according to embodiments of the present invention.

FIG. 1 is a block diagram of an exemplary apparatus for switching root cells for a computer system without requiring the computer system to be re-booted, according to embodiments of the present invention. The blocks in FIG. 1 can be arranged differently than as illustrated, and can implement additional or fewer features than what are described herein. Further, the features represented by the blocks in FIG. 1 can be combined in various ways. The apparatus 100 can be hardware, firmware, software, or a combination thereof, among other things. The apparatus 100, as depicted in FIG. 1, includes a fixed register describer 110 and a fixed register communicator 120. The fixed register describer 110, as will become more evident, can be used as a part of creating objects that represent fixed registers associated with a first cell and a second cell of a computer system. The fixed register describer 110 can be entered into the computer system for the purpose of enabling the computer system to determine, for example, what cell (which in the illustration described herein is the second cell) should replace the root cell (which in the illustration described herein is the first cell) in the event that the root cell becomes defective, among other things, according to one embodiment.

The fixed register communicator 120 uses the objects to communicate information between the firmware and an operating system associated with the computer system in response to detecting that a second cell should be used as a root cell instead of the first cell, according to one embodiment. The information that is communicated between the firmware and the operating system describes the fixed registers associated with the second cell, according to another embodiment. For example, as will become more evident, the fixed register communicator 120 uses a notify method to inform the operating system that a system's administrator has initiated the ejection of the current root cell (e.g., first cell), and other methods to provide information about the fixed registers associated with the new root cell (e.g., a second cell), among other things, according to still another embodiment. Thus, a second cell is hot plugged into the computer system as the root cell, as will become more evident, according to embodiments of the present invention.

Figure 2:
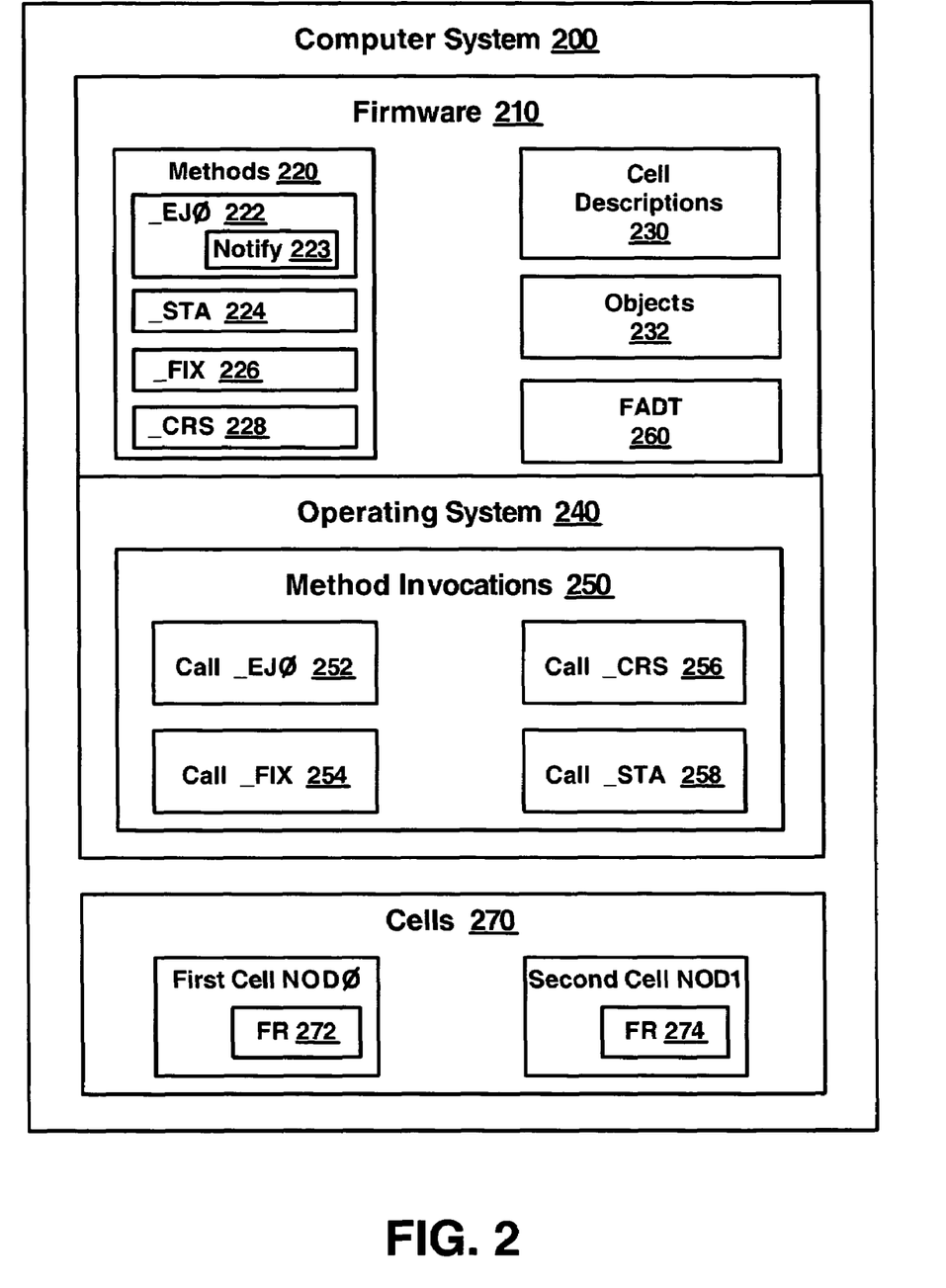
FIG. 2 is a block diagram of an exemplary computer system that uses an apparatus for switching root cells for a computer system without requiring the computer system to be re-booted, according to embodiments of the present invention.

FIG. 2 is a block diagram of an exemplary computer system that uses an apparatus for switching root cells for a computer system without requiring the computer system to be re-booted, according to embodiments of the present invention. The blocks in FIG. 2 can be arranged differently than as illustrated, and can implement additional or fewer features than what are described herein. Further, the features represented by the blocks in FIG. 2 can be combined in various ways. As depicted in FIG. 2, the computer system 200 includes cells 270, firmware 210, and an operating system 240. The cells 270 are a first cell NOD0 and a second cell NOD1. Fixed registers 272, 274 can be associated respectively with each of the cells NOD0, NOD1.

The firmware 210 can include cell descriptions 230. The cell descriptions 230 can include data for creating objects 232 that represent fixed registers associated with the cells 270. Further, the firmware 210 can include an optional FADT 260, and methods 220 that can be used to operate on the objects 232, such as a method for ejecting (e.g., _EJO 222) a root cell that an object describes, a method for notifying (e.g., notify 223) the operating system 240 that an ejection has been requested, a method for obtaining a list of the fixed registers 272, 274 (e.g., _FIX 226) associated with a cell, a method for obtaining information about the fixed registers 272, 274 (e.g., _CRS 228), and a method for obtaining the status (e.g., "alive" or "not alive") of a cell (e.g., _STA 224). The operating system 240 includes method invocations (e.g, instructions) for invoking the methods 220. For example the OS can use "call _EJ0 252" to invoke _EJ0 222, "call _FIX 254" to invoke _FIX 226, "call _CRS 256" to invoke _CRS 228, and so on. According to one embodiment, the cell descriptions 230 are an example of a fixed register describer 110. According to another embodiment, the methods 220 and the method invocations 250 are an example of a fixed register communicator 120.

Fixed Registers and Fixed Register Identifiers

The operating system 240 of a computer system 200 can use fixed registers for various system events, such as the computer clock, etc. Different computer platforms can choose to use different fixed registers depending on which system events that platform chooses to support. Further, ACPI specifies various identifiers for ACPI fixed registers. The following is a table that lists the fixed registers (also referred to as "fixed register resources") and the identifiers that ACPI has defined for the corresponding fixed registers.

TABLE 1

Fixed registers and the corresponding identifiers

| IDENTIFIERS | FIXED REGISTERS |
|---|---|
| PNP0C20 | SMI_CMD |
| PNP0C21 | PM1a_EVT_BLK/X_PM1a_EVT_BLK |
| PNP0C22 | PM1b_EVT_BLK/X_PM1b_EVT_BLK |
| PNP0C23 | PM1a_CNT_BLK/X_PM1a_CNT_BLK |
| PNP0C24 | PM1b_CNT_BLK/X_PM1b_CNT_BLK |
| PNP0C25 | PM2_CNT_BLK/X_PM2_CNT_BLK |
| PNP0C26 | PM_TMR_BLK/X_GPE0_BLK |
| PNP0C27 | GPE0_BLK/X_GPE0_BLK |
| PNP0C28 | GPE1_BLK/X_GPE1_BLK |
| PNP0B00 | FIXED_RTC |
| PNP0B01 | FIXED_RTC |
| PNP0B02 | FIXED_RTC |

Cell Descriptions

According to one embodiment of the present invention, the identifiers (refer to the first column of TABLE 1 above) can be used for creating objects 232 that describe the fixed registers (refer to the second column of TABLE 1 above), as will become more evident. For example, a systems administrator can enter cell descriptions 230, which specify identifiers, into a computer system 200 for the purpose of creating objects 232 that represent fixed registers 272, 274. The firmware 210 can use the identifiers specified by cell descriptions 230 to determine what objects 232 to create that describe the fixed registers that a particular platform has been implemented to support. Examples of objects 232 include, but are not limited to, objects that specify what the fixed registers are, objects that specify the addresses of fixed registers, and module devices that can be used as a "container" of fixed registers, as will become more evident. Table 2 below depicts cell descriptions 230, according to embodiments of the present invention.

TABLE 2

Cell descriptions

| Line No. | Cell Descriptions | |
|---|---|---|
| 1 | Scope(\_SB) { | |
| 2 | Device(NOD0) { | // Root Cell |
| 3 | Name(_HID, "DIG0001") | // Cell _HID |
| 4 | Name(_CID, "ACPI0004") | // Cell _CID |
| 5 | Name(_UID, 0) | // Root cell _UID |
| 6 | Method(_EJ0, 0) { | |
| 7 | ... | |
| 8 | Notify(\_SB.NOD1,0) | |
| 9 | } | // Root cell hot remove |
| 10 | Method(_STA, 0) {...} | |
| 11 | ... | |
| 12 | Device(FIX0){ | // ACPI Fixed Register Hardware |
| 13 | Name(_HID, "DIG0002") | |
| 14 | Name(_CID, "ACPI0004") | |
| 15 | Name(_UID, 0) | |
| 16 | Method(_STA, 0) {...} | |
| 17 | Name(_FIX, Package (6) { | |
| 18 | EISAID("PNP0C21"), | // PM1a_EVT_BLK / X_PM1a_EVT_BLK |
| 19 | EISAID("PNP0C23"), | // PM1a_CNT_BLK / X_PM1a_CNT_BLK |
| 20 | EISAID("PNP0C25"), | // PM2_CNT_BLK / X_PM2_CNT_BLK |
| 21 | EISAID("PNP0C26"), | // PM_TMR_BLK / X_PM_TMR_BLK |
| 22 | EISAID("PNP0C27"), | // GPE0_BLK / X_GPE0_BLK |
| 23 | EISAID("PNP0C28")} | // GPE1_BLK / X_GPE1_BLK |
| 24 | ) | |
| 25 | Method (_CRS,0){ | // Need current resources for fixed registers |
| 26 | // Return current resources for fixed registers in the order shown | |
| 28 | // in _FIX | |
| 29 | } | |
| 30 | ... | |
| 31 | } | |
| 32 | ... | |
| 33 | } | |
| 34 | Device(NOD1) { | // Non-Root Cell |
| 35 | Name(_HID, "DIG0001") | // Cell _HID |
| 36 | Name(_CID, "ACPI0004") | // Cell _CID |
| 37 | Name(_UID, 1) | // cell _UID |
| 38 | Method(_EJ0, 0) {...} | // cell hot remove |
| 39 | Method(_STA, 0) {...} | |
| 40 | ... | |
| 41 | Device(FIX1){ | // ACPI Fixed Register Hardware |
| 42 | Name(_HID, "DIG0002") | |
| 43 | Name(_CID, "ACPI0004") | |
| 44 | Name(_UID, 1) | |
| 45 | Method(_STA, 0) {...} | |
| 46 | Name(_FIX, Package (6) { | |
| 47 | EISAID("PNP0C21"), | // PM1a_EVT_BLK / X_PM1a_EVT_BLK |
| 48 | EISAID("PNP0C23"), | // PM1a_CNT_BLK / X_PM1a_CNT_BLK |
| 49 | EISAID("PNP0C25"), | // PM2_CNT_BLK / X_PM2_CNT_BLK |
| 50 | EISAID("PNP0C26"), | // PM_TMR_BLK / X_PM_TMR_BLK |
| 51 | EISAID("PNP0C27"), | // GPE0_BLK / X_GPE0_BLK |
| 52 | EISAID("PNP0C28")} | // GPE1_BLK / X_GPE1_BLK |
| 53 | ) | |
| 54 | Method (_CRS,0){ | // Need current resources for fixed registers |
| 55 | // Return current resources for fixed registers in the order shown | |
| 56 | // in _FIX | |
| 57 | } | |
| 58 | ... | |
| 59 | } | |
| 60 | ... | |
| 61 | } | |
| 62 | ... | |
| 63 | } | |

Table 2 depicts cell descriptions 230 for two cells 270 (e.g., NOD0 and NOD1). The cell description for cell NOD0 is depicted in lines 1-33 and the cell description for cell NOD1 is depicted in lines 34-63. Data describing the fixed registers 272 associated with cell NOD0 is depicted on lines 18-23 and data describing the fixed registers 274 associated with cell NOD1 is depicted on lines 47-52. A computer system 200 can use the identifiers on lines 18-23 and lines 47-52 as a part of creating objects 232 that represent fixed registers 272, 274, according to an embodiment. According to another embodiment, the cell descriptions 230 depicted in TABLE 2 is an example of a fixed register describer 110 (FIG. 1), as will become more evident.

Module Device

Further, the cell descriptions 230 can specify data that describes a module device. A module device can be used as a "container" for the fixed registers that correspond to a cell. Continuing the discussion, TABLE 2 further depicts data for describing a module device FIX0, FIX1 for each cell NOD0, NOD1. For example, from lines 12-31 data describing module device FIX0 is specified for NOD0 and from lines 41-59 data describing module device FIX1 is specified for NOD1. "FIX0" is the module device name associated with cell NOD0, as specified on line 12. "FIX1" is the module device name associated with cell NOD1, as specified on line 41. A computer system 200 can use the FIX0 and the FIX1 data specified by cell descriptions 230 as a part of creating objects 232 that represent module devices, as will become more evident.

According to one embodiment, one or more identifiers can be used to designating a module device. For example, a generic ACPI identifier, such as ACPI0004 (refer to lines 14, 43), can be used to describe a module device as a single device. To further make the module devices distinct, a specific identifier, such as DIG0002 (refer to lines 13, 42), can be used for example to inform the computer system 200 of the special purpose associated with a module device.

By using a module device to contain information that describes fixed registers, various ACPI mechanisms can be used to implement embodiments of the present invention, such as objects 232, methods 220 for the objects 232, and device insertion and/or removal mechanisms.

Since all of the fixed registers for a particular cell typically reside on the cell, a single device as represented by a module device can easily be used for "containing" information that describes fixed registers 272, 274, according to one embodiment, thus, the adding and/or removing of partial sets of fixed registers can be avoided. For example, if the fixed registers 272 associated with NOD0 were spread across several devices, then each of the devices would be added and/or removed. However, having all the fixed registers for a cell associated with a single device is not a requirement for embodiments of the present invention.

Objects

As already stated, cell descriptions 230 include data that can be used for creating objects 232 that represent module devices, among other things. Further, the cell descriptions 230 also include data that can be used for creating other objects 232, such as objects that specify what the fixed registers 272, 274 are and objects 232 that specify the addresses of fixed registers 272, 274. For example, the "_FIX 226" method can be used for providing a list of the fixed registers 272, 274 associated with a module device and the "_CRS 228" method can be used for providing the addresses of the fixed registers 272, 274 associated with the same module device. More specifically, lines 17-24 and lines 46-53 depicts data that describes the respective "_FIX 226" methods that correspond to the respective cells NOD0, NOD1. Further, lines 25-29 and lines 54-57 depict data that describes the respective addresses for the fixed registers 272, 274 depicted with the corresponding "_FIX 227" methods. More specifically, lines 25-29 depict data that describes addresses for the fixed registers 272 depicted with the "_FIX" label depicted at lines 17-24. Similarly, lines 54-57 depict data that describes addresses for the fixed registers 274 depicted with the "_FIX" label depicted at lines 46-53.

According to one embodiment, the order that the fixed registers are specified under the _FIX label (refer to lines 17, 46 respectively) is the same as the order of the addresses of the fixed registers 272, 274 are specified under the _CRS label (refer to lines 30, 58 respectively). For example, on line 18 the fixed register PNP0C21 is specified before the fixed register PNP0C23 on line 19. In this case, the address for PNP0C21 would be specified before the address of PNP0C23 under the _CRS label at line 30, according to one embodiment. According to another embodiment, the fixed registers 272, 274 and their respective addresses can be specified in different orders, as will become more evident.

For the sake of simplicity, the addresses of the fixed registers are not depicted under the _CRS labels (refer to lines 25, 54) at lines 30, 58 of TABLE 2.

Methods

The cell descriptions 230 can also include data that describes what methods 220 can be used with the various objects 232 that are created as a result of a computer system 200 parsing cell descriptions 230. For example, the cell description can specify that the methods 220 eject (e.g., _EJ0 222), notify 223, provide list fixed registers (e.g., _FIX 226), provide addresses of fixed registers (e.g., _CRS 228), provide status of a cell (e.g., _STA 224), etc. can be used with objects 232 that represent the fixed registers for each cell. More specifically, lines 6, 38 of TABLE 2 specify that the eject method (e.g., _EJ0 222) can be used with the respective module devices FIX0 (refer to line 12), FIX1 (refer to line 41) for the respective cells NOD0, NOD1.

Further, the cell descriptions 230 depicted in TABLE 2 specify methods 220 (FIG. 2) for cells NOD0, NOD1 for providing a list of fixed registers (e.g., _FIX label on lines 17, 41), for providing the addresses of the fixed registers (e.g., _CRS label on lines 25, 54), and for providing the status of the cell (e.g., STA on lines 10, 45), which can be used with their respective module devices FIX0, FIX1. Further, on line 8 the cell descriptions 230 specify that the notify 223 method can be used for NOD0 when, for example, the firmware 210 detects that an eject has been initiated for the root cell. For example, as depicted line 8 of TABLE 2, the notify 223 notifies the operating system 240 that NOD1 will be the new root cell in the event that the initial root cell NOD0 is ejected.

As defined by ACPI, fixed registers are system wide resources. If each cell were to implement ACPI fixed registers, then only one of the cells 270 could be the root cell at any given point in time, according to one embodiment. The _STA 224 method can be used for determining which cell is "alive" in order to avoid inadvertently attempting to have two root cells at one time, as will become more evident.

Operational Example

Figure 3:
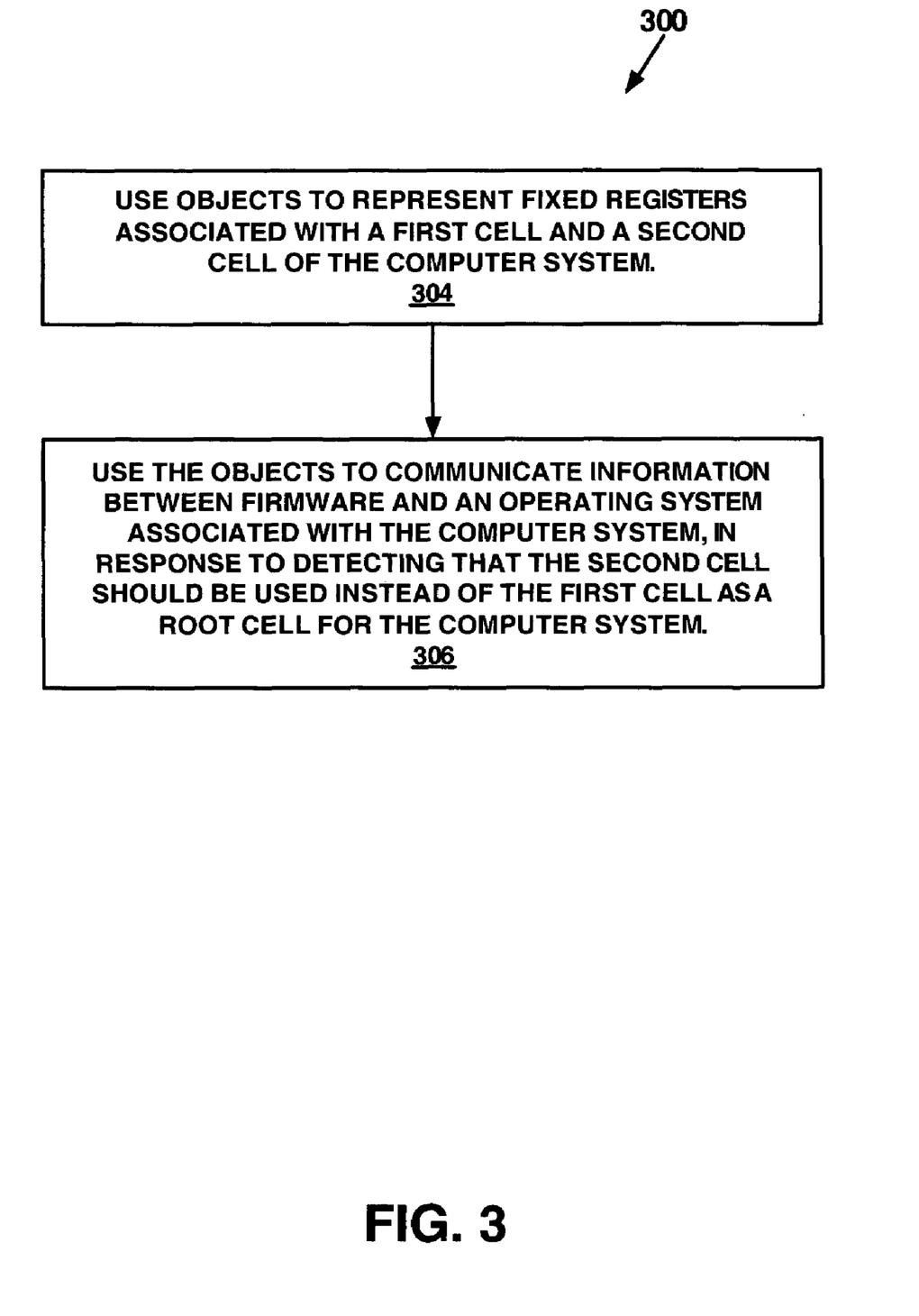
FIG. 3 depicts a flowchart for a method of switching root cells for a computer system without requiring the computer system to be re-booted, according to embodiments of the present invention.

FIG. 3 depicts a flowchart 300 for a method of switching root cells for a computer system without requiring the computer system to be re-booted, according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system 200 or like device.

As described above, certain processes and steps of the present invention are realized, in one embodiment, as a series of instructions (e.g., software program) that reside within computer readable memory of a computer system 200 and are executed by the of the system 200. When executed, the instructions cause the computer system 200 to implement the functionality of the present invention as described below.

For the purposes of illustration, the discussion of flowchart 300 shall refer to the structures depicted in FIG. 2. and the cell descriptions 230 depicted in TABLE 2. Further, assume that the cell descriptions 230 are a fixed register describer 110.

Initially, when the computer system 200 is booted up the firmware 210 can use the FADT 260 to determine what the fixed registers are and the addresses of the fixed registers. For the purpose of illustration, assume that the first cell NOD0 is initially the root cell and therefore, the FADT 260 would indicate that fixed registers 272 associated with the first cell NOD0 are the fixed registers. The firmware 210 communicates what the fixed registers are and the addresses to the operating system 240.

In step 304, objects are used to represent fixed registers associated with a first cell and a second cell of the computer system. For example, a fixed register describer 110, such as the cell descriptions 230 depicted in TABLE 2, can be used as a part of creating objects 232 that represent fixed registers 272, 274 associated with a first cell NOD0 and a second cell NOD1. A system's administrator can enter cell descriptions 230 as depicted in TABLE 2 into the computer system 200. The computer system 200 can parse the cell descriptions 230 and use data associated with the cell descriptions 230 to create objects 232 representing the fixed registers 272, 274, according to embodiments already described herein. According to another embodiment, as a part of creating the objects 232, the methods 220 for operating on the objects 232 can also be created.

For the sake of illustration, assume that the first cell NOD0 initially is the root cell and the second cell NOD1 will become the root cell in the event that the root cell is ejected, for example, because the root cell is damaged. The computer system 200 can create error logs indicating that the root cell is damaged and the system's administrator can determine from the error logs that the root cell is damaged.

In step 306, in response to detecting that the second cell should be used instead of the first cell as a root cell for the computer system, the objects are used to communicate information between firmware and an operating system associated with the computer system. For example, the system's administrator can initiate the removal of the root cell NOD0 and the replacement of the root cell NOD0 with another cell NOD1. The system's administrator can use an eject command to remove the root cell. The operating system 240 can use the instruction "call _EJ0 252" to invoke the "_EJ0 222" method for the current root cell (e.g., NOD0). In response to the "_EJ0 222" method being called, the firmware 210 can do two things. One, the firmware 210 can prepare to return an "alive" status when the "_STA 224" method for FIX1, associated with the second cell NOD1 is invoked by the operating system 240 and two, send a notify 223 (FIG. 2) to the operating system 240 to cause the operating system 240 to invoke FIX1's "_STA 224." The operating system 240 can use the instruction "call _STA 258" to invoke FIX1's "_STA 224" method.

At this point, the status of the first cell NOD0 is "not alive" and the status of the second cell NOD1 is "alive" therefore, FIX1's _STA 224 can return a status of "alive" to the operating system 240. The operating system 240 could use the instructions "call _FIX 254" and "call _CRS 256" to obtain a list of the fixed registers 274 for the new root cell (e.g., second cell NOD1) and the corresponding addresses of these fixed registers 274. In so doing, the objects 232 that represent the fixed registers 274 can be used to communicate what the fixed registers 274 are for the new root cell NOD1 and their (e.g., 274) respective addresses between the firmware 210 and an operating system 240 associated with the computer system 200 for the purpose of switching root cells (e.g., from NOD0 to NOD1) without requiring the computer system 200 to be re-booted.

The root call can be switched again according to embodiments of the present invention. For example, another root cell can be hot plugged into the computer system 200 and a method and/or apparatus as described herein can be used to make it the root cell instead of NOD1. For example, a new undamaged device can be hot plugged into the computer system 200 using the cell name NOD0. Alternatively, a new undamaged device can be hot plugged into the computer system 200 using a cell name, such as NOD2, and it can become the new root cell.

Extensions and Alternatives

Although certain embodiments of the present invention were described using cell descriptions as depicted in TABLE 2, the present invention is not limited to the cell descriptions depicted in TABLE 2 described herein. For example, as already stated, according to the embodiment depicted in TABLE 2 the order of the fixed registers (refer to lines 18-23 and lines 47-52) and the order of the corresponding addresses (lines 30, 58) are the same. However, according to another embodiment, the order of the fixed registers and their corresponding addresses can be different. TABLE 3 depicts an embodiment, where the order of the fixed registers and their corresponding addresses can be different. More specifically, the fixed register identifier and addresses of fixed registers can be specified on a per device basis. For example, for device 1AE0, the identifier for fixed register PNP0C21 (refer to line 19) and the address of PNP0C21 can be specified (refer to line 25) for device 1AC0 the identifier for fixed register PNP0C23 (refer to line 28) and the address can be specified (refer to line 34), and so on.

TABLE 3

Cell Descriptions

| Line No. | Cell Descriptions | |
|---|---|---|
| 1 | Scope(\_SB) { | |
| 2 |   Device(NOD0) { | // Root Cell |
| 3 |     Name(_HID, "DIG0001") | // Cell _HID |
| 4 |     Name(_CID, "ACPI0004") | // Cell _CID |
| 5 |     Name(_UID, 0) | // Root cell _UID |
| 6 |     Method(_EJ0, 0) { | |
| 7 |       ... | |
| 8 |       Notify(\_SB.NOD1,0) | |
| 9 |     } | // Root cell hot remove |
| 10 |     Method(_STA, 0) {...} | |
| 11 |     ... | |
| 12 |     Device(FIX0){ | // ACPI Fixed Register |
| 13 |     Container | |
| 14 |       Name(_HID, "DIG0002") | |
| 15 |       Name(_CID, "ACPI0004") | |
| 16 |       Name(_UID, 0) | |
| 17 |       Method(_STA, 0) {...} | |
| 18 |       Device(1AE0){ | |
| 19 |         Name(_HID, EISAID("PNP0C21") | |
| 20 |         Name(_UID, 0) | |
| 21 |         Name(_CRS, 0){ | |
| 22 |           // return the address for the PM1a_EVT | |
| 23 | register | |
| 24 |         } | |
| 25 |         ... | |
| 26 |       } | |
| 27 |       Device(1AC0){ | |
| 28 |         Name(_HID, EISAID("PNP0C23") | |
| 29 |         Name(_UID, 0) | |
| 30 |         Name(_CRS, 0){ | |
| 31 |           // return the address for the PM1a_CNT | |
| 32 | register | |
| 33 |         } | |
| 34 |         ... | |
| 35 |       } | |
| 36 |       Device(2_C0){ | |
| 37 |         Name(_HID, EISAID("PNP0C25") | |
| 38 |         Name(_UID, 0) | |
| 39 |         Name(_CRS, 0){ | |
| 40 |           // return the address for the PM2_CNT | |
| 41 | register | |
| 42 |         } | |
| 43 |         ... | |
| 44 |       } | |
| 45 |       Device(TMR0){ | |
| 46 |         Name(_HID, EISAID("PNP0C26") | |
| 47 |         Name(_UID, 0) | |
| 48 |         Name(_CRS, 0){ | |
| 49 |           // return the address for the PM_TMR | |
| 50 | register | |
| 51 |         } | |
| 52 |         ... | |
| 53 |       } | |
| 54 |       Device(GP00){ | |
| 55 |         Name(_HID, EISAID("PNP0C27") | |
| 56 |         Name(_UID, 0) | |
| 57 |         Name(_CRS, 0){ | |
| 58 |           // return the address for the GPE0 register | |
| 59 |         } | |
| 60 |         ... | |
| 61 |       } | |
| 62 |       Device(GP10){ | |
| 63 |         Name(_HID, EISAID("PNP0C28") | |
| 64 |         Name(_UID, 0) | |
| 65 |         Name(_CRS, 0){ | |

TABLE 3-continued

Cell Descriptions

| Line No. | Cell Descriptions |
|---|---|
| 66 | // return the address for the GPE1 register |
| 67 | } |
| 68 | ... |
| 69 | } |
| 70 | |

Embodiments of the present invention are thus described. While the present invention has been described in particular embodiments, it should be appreciated that the present invention should not be construed as limited by such embodiments, but rather construed according to the following claims.

What is claimed is:

1. A method of switching root cells for a computer system without requiring the computer system to be re-booted, the method comprising:
using objects to represent fixed registers associated with a first cell and a second cell of the computer system; and
in response to detecting that the second cell should be used instead of the first cell as a root cell for the computer system, using the objects to communicate information between firmware and an operating system associated with the computer system, wherein the information describes the fixed registers associated with the second cell.

2. The method as recited in claim 1, wherein data specifies the fixed registers and addresses for the fixed registers and wherein the method further comprises:
using data to specify the fixed registers and the addresses for the fixed registers in the same order; and
using the data to create the objects.

3. The method as recited in claim 1, further comprising:
using a first device to contain the fixed registers for the first cell and a second device to contain the fixed registers for the second cell.

4. The method as recited in claim 3, wherein the first device and the second device are module devices.

5. The method as recited in claim 3, further comprising:
detecting that an ejection has been initiated for the first device; and
in response to detecting the ejection, detecting that the second cell should be used instead of the first cell as the root cell for the computer system.

6. The method as recited in claim 1, wherein methods are associated with the objects and wherein a method is selected from a group consisting of eject, provide a list of the fixed registers, provide addresses for the fixed registers, and provide the status of the second cell.

7. The method as recited in claim 1, further comprising:
using Advanced Configuration and Power Interface (ACPI) to describe the objects.

8. An apparatus for switching root cells associated with a computer system without requiring the computer system to be re-booted, the method comprising:
a fixed register describer is used for creating objects that represent fixed registers associated with a first cell and a second cell of the computer system; and
a fixed register communicator uses the objects to communicate information between firmware and an operating system associated with the computer system in response to detecting that the second cell is intended to be used instead of the first cell as a root cell for the computer system, wherein the information describes the fixed registers associated with the second cell.

9. The apparatus of claim 8, wherein the fixed register describer includes data specifying the fixed registers and addresses for the fixed registers in the same order and wherein the computer system uses the fixed register describer to create the objects.

10. The apparatus of claim 8, wherein a first device contains the fixed registers for the first cell and a second device contains the fixed registers for the second cell.

11. The apparatus of claim 10, wherein the first device and the second device are module devices.

12. The apparatus of claim 10, wherein the fixed register communicator uses the objects to communicate the information between firmware and an operating system associated with the computer system in response to detecting an initiation of an ejection of the first device.

13. The apparatus of claim 8, wherein the computer system uses methods associated with the objects to communicate the information between the firmware and the operating system and wherein a method is selected from a group consisting of eject, provide a list of the fixed registers, provide addresses for the fixed registers, and provide the status of the second cell.

14. The apparatus of claim 8, wherein Advanced Configuration and Power Interface (ACPI) is used for the fixed register describer.

15. A computer-usable medium having computer-readable program code embodied therein when executed by a computer system for causing the computer system to perform a method of switching root cells for a the computer system without requiring the computer system to be re-booted, the method comprising:
using objects to represent fixed registers associated with a first cell and a second cell of the computer system; and
in response to detecting that the second cell should be used instead of the first cell as a root cell for the computer system, using the objects to communicate information between firmware and an operating system associated with the computer system, wherein the information describes the fixed registers associated with the second cell.

16. The computer readable medium of claim 15, wherein data specifies the fixed registers and addresses for the fixed registers and wherein the computer-readable program code embodied therein causes the computer system to perform the method, and wherein the method further comprises:
using data to specify the fixed registers and the addresses for the fixed registers in the same order; and
using the data to create the objects.

17. The computer readable medium of claim 15, wherein the computer-readable program code embodied therein causes the computer system to perform the method, and wherein the method further comprises:
using a first device to contain the fixed registers for the first cell and a second device to contain the fixed registers for the second cell.

18. The computer readable medium of claim 17, wherein the first device and the second device are module devices and wherein the computer readable medium further comprises program code embodied therein to cause the computer system to create module devices.

19. The computer readable medium of claim 17, wherein the computer-readable program code embodied therein causes the computer system to perform the method, and wherein the method further comprises:
  detecting that an ejection has been initiated for the first device; and
  in response to detecting the ejection, detecting that the second cell should be used instead of the first cell as the root cell for the computer system.

20. The computer readable medium of claim 15, wherein the computer-readable program code embodied therein causes the computer system to perform the method, and wherein the method further comprises:
  using Advanced Configuration and Power Interface (ACPI) to describe the objects.

* * * * *

UNITED STATES PATENT AND TRADEMARK OFFICE
CERTIFICATE OF CORRECTION

| | | |
|---|---|---|
| PATENT NO. | : 7,350,010 B2 | |
| APPLICATION NO. | : 11/261374 | |
| DATED | : March 25, 2008 | |
| INVENTOR(S) | : Dong Wei et al. | |

It is certified that error appears in the above-identified patent and that said Letters Patent is hereby corrected as shown below:

In column 12, line 34, in Claim 15, after "cells for" delete "a".

Signed and Sealed this

Fifth Day of August, 2008

JON W. DUDAS
*Director of the United States Patent and Trademark Office*